UNITED STATES PATENT OFFICE.

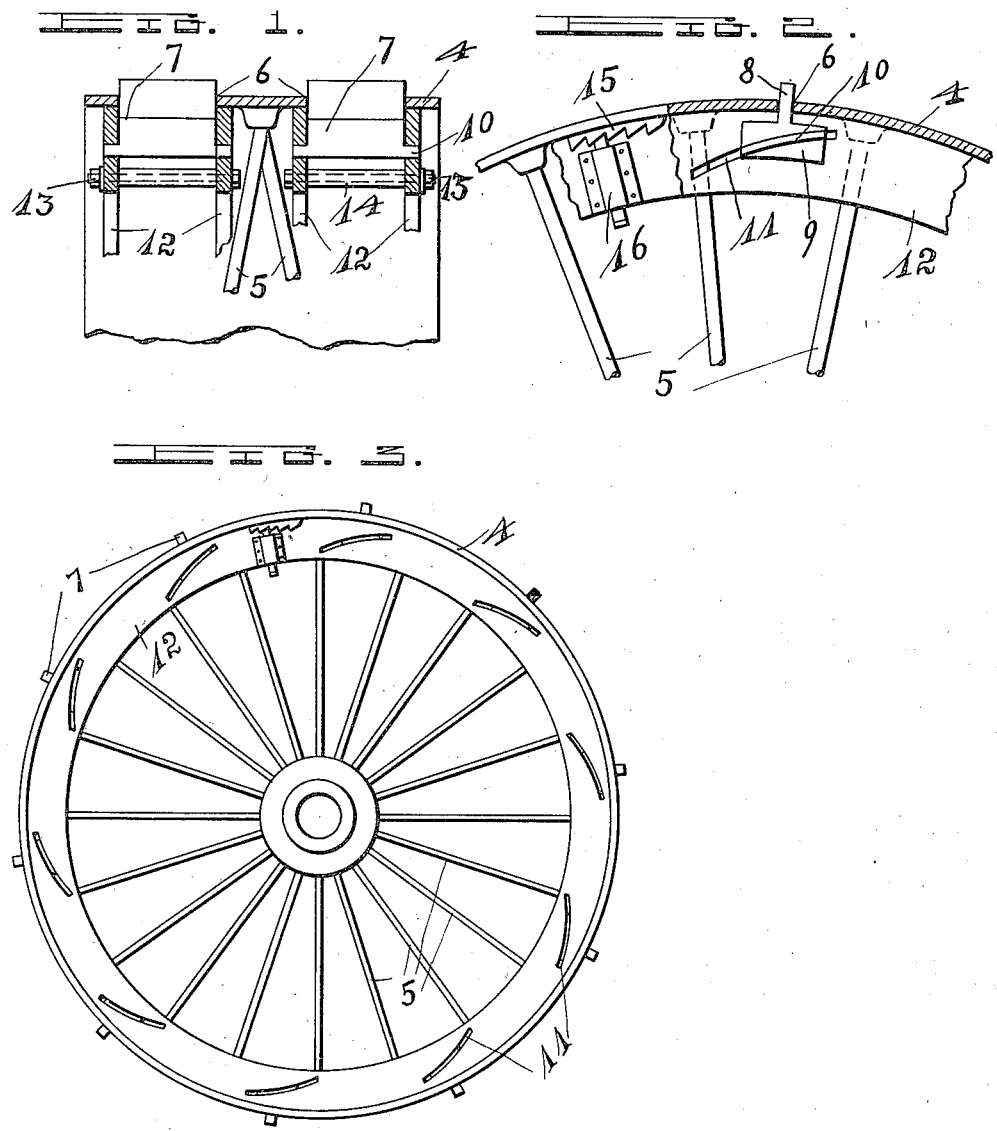

ISAAC H. ROHRER, OF SAN FERNANDO, CALIFORNIA.

TRACTION-WHEEL.

1,262,847.  Specification of Letters Patent.  Patented Apr. 16, 1918.

Application filed April 16, 1917. Serial No. 162,438.

*To all whom it may concern:*

Be it known that I, ISAAC H. ROHRER, a citizen of the United States, residing at San Fernando, in the county of Los Angeles and State of California, have invented new and useful Improvements in Traction-Wheels, of which the following is a specification.

My invention relates to traction-wheels in which the tractor elements are disappearably mounted; and the objects of my improvements are, to provide a simple device which can easily be operated when driving from a paved street over to loose ground, in which case the device may be operated so as to form lugs or grousers on the outside of the wheel, or when driving in the opposite direction in which case the device may be operated so as to withdraw the lugs or grousers to form a smooth surface on the outside of the wheel tread; to provide flanges between which lugs or grousers are adjustably held to be projected through the tread of the wheel or to be withdrawn by a movement of the flanges; the invention consisting in the construction, combination and arrangement of devices hereafter more fully described and claimed, and illustrated in the accompanying drawing, in which—

Figure 1 is a fragmentary cross section of a portion of a wheel with the several parts of my device in place.

Fig. 2 is a fragmentary side elevation of a portion of the wheel with a portion of my extra flanges and several parts of my device in place.

Fig. 3 is a side elevation of a wheel with my device assembled therein.

Similar numbers refer to similar parts throughout the papers.

In Fig. 1, 4 designates the tread or tire of a wheel, and 5 the spokes The tread or tire 4 is provided with openings or slots 6, in which the lugs or grousers 7 are slidably mounted projecting through the tread of the wheel. The lugs or grousers, forming the tractor elements of my device, are constructed to project through or withdraw to within the surface of the tread or tire of the wheel with the tractor member 8. A supporting member 9 is formed on the tractor member having suitably formed lips slidingly fitting in slot 11 in the rims or rings 12. The rims or rings 12 are slidingly turnable within the tire of the wheel. The slots 11 in the rings are provided in sloping relation to the tire, and the lips 10 on the supporting members of the tractor elements are correspondingly constructed so as to be moved radially by a turning of the rings. The lugs 10 on the supporting member 9 of the tractor members 8 are elongated and conform to the contour of the slots 11 in the rims or rings 12 to such an extent as to prevent the spurs on the tractor members from tipping in whatever position they are held by the rings or rims 12.

Having placed the tractor elements into the slots 6 in the tread or tire of the wheel and having the rings or rims 12 placed sidewise from the tractor elements within the tire, the rims are held together by the bolts 13. A distance member in form of a piece of pipe is inserted on the bolt between the rims allowing an easy movement of the tractor elements. By thus disposing the tractor elements and the rims, the whole device is interlocked within the wheel except for a short turn of the whole device limited by the length of the slots 11 in the rims.

To hold the tractor elements in projected or withdrawn position in relation to the tire, a multiple stopping member 15 is provided on the tire of the wheel at a suitable place and a locking member 16 is provided on the rim 12.

Driving the vehicle, which may be a tractor or other farm vehicle on which tractor elements are necessary on the wheels, from the fields over to a paved street, the locking member 16 is released and the rims with the tractor elements are moved to a position to withdraw the tractor elements to within the surface of the wheel-tread. Driving from a paved street over to the fields where the vehicle shall produce power through the tractor elements in the wheels, the locking member 16 is released, and the rims are turned to a suitable position so as to bring the tractor elements out into a position so as to form grousers on the outside or on the surface of the tread or tire of the wheel.

Having thus described my invention, I claim:—

1. In combination with a tractor wheel having slots in the tread and tractor members disposed so as to project through the slots in the tread and having extension ends projecting sidewise elongated transversely to the tread part of the tractor members, and rotatable rings disposed within the rim of the wheel sidewise of the tractor members having slots to correspond with the extension ends of the tractor members so as to prevent the tractor members from tipping.

2. In combination with a tractor wheel having slots in the tread, a suitable number of rings rotatably disposed in pairs within the rim of a wheel having slots inclined to the rim of the wheel, and a suitable number of tractor members having a tread part radially slidingly mounted in the slots of the rim of the wheel having also extension ends projecting sidewise and elongated to conform to the contour of the slots in the rings for slidingly engaging with the rings so as to prevent the tractor members from tipping.

3. In combination with a tractor wheel having openings in the tread, a suitable number of rings rotatably disposed in pairs within the rim having slots inclined to the rim, a suitable number of tractor members having tread parts radially slidingly mounted in the openings of the rim and having also extension ends extending sidewise and elongated to conform to the contour of the slots in the rings so as to prevent a tipping of the tractor members, and connecting means provided for inter-connecting the rings and tractor members within the wheel.

In testimony whereof I hereunto affix my signature in the presence of two witnesses.

ISAAC H. ROHRER.

Witnesses:
  OTTO H. KRUEGER,
  C. MITSCHLER.